United States Patent
Floyd

(10) Patent No.: US 7,208,855 B1
(45) Date of Patent: Apr. 24, 2007

(54) FIBER-OPTIC CABLE AS INTEGRAL PART OF A SUBMERSIBLE MOTOR SYSTEM

(75) Inventor: Raymond E. Floyd, Oklahoma City, OK (US)

(73) Assignee: Wood Group ESP, Inc., Oklahoma City, OK (US)

( * ) Notice: Subject to any disclaimer, the term of this patent is extended or adjusted under 35 U.S.C. 154(b) by 133 days.

(21) Appl. No.: 10/800,171

(22) Filed: Mar. 12, 2004

(51) Int. Cl.
*H01B 11/22* (2006.01)
*E21B 47/00* (2006.01)
*G02B 6/36* (2006.01)
*H02K 11/00* (2006.01)

(52) U.S. Cl. .................. 310/71; 310/87; 166/66.4; 385/101; 385/97; 385/98

(58) Field of Classification Search .......... 310/71, 310/87, 216; 85/101, 135, 97, 98, 65.1; 166/66.4, 166/65.1; 385/101, 135, 97, 98
See application file for complete search history.

(56) References Cited

U.S. PATENT DOCUMENTS

| | | | |
|---|---|---|---|
| 4,162,400 A | 7/1979 | Pitts, Jr. ................. 340/854.7 |
| 4,275,319 A * | 6/1981 | Davis, Jr. .................... 310/43 |
| 4,927,232 A | 5/1990 | Griffiths ...................... 385/13 |
| 4,952,012 A | 8/1990 | Stamnitz .................... 385/101 |
| 5,414,507 A | 5/1995 | Herman et al. ............. 356/477 |
| 5,495,547 A | 2/1996 | Rafie et al. ................. 385/101 |
| 5,677,974 A | 10/1997 | Elms et al. ................. 385/101 |
| 5,687,271 A | 11/1997 | Rabinowitz ................. 385/101 |
| 5,714,811 A * | 2/1998 | Jung ........................ 310/68 B |
| 5,892,860 A | 4/1999 | Maron et al. ................. 385/12 |
| 5,986,749 A | 11/1999 | Wu et al. ................... 356/73.1 |
| 6,005,242 A | 12/1999 | Chernyak ............... 250/227.14 |
| 6,006,837 A * | 12/1999 | Breit ........................... 166/302 |
| 6,040,759 A | 3/2000 | Sanderson ............... 340/310.1 |
| 6,137,621 A | 10/2000 | Wu ............................. 359/290 |
| 6,167,965 B1 * | 1/2001 | Bearden et al. ......... 166/250.15 |
| 6,192,983 B1 | 2/2001 | Neuroth et al. ......... 166/250.15 |
| 6,213,202 B1 * | 4/2001 | Read, Jr. .................... 166/55.1 |
| 6,252,656 B1 | 6/2001 | Wu et al. ................... 356/73.1 |
| 6,281,489 B1 | 8/2001 | Tubel et al. ........... 250/227.14 |
| 6,396,415 B1 | 5/2002 | Bulmer .................... 340/855.8 |
| 6,446,723 B1 * | 9/2002 | Ramos et al. ................ 166/285 |
| 6,457,531 B1 | 10/2002 | Bangash et al. ............. 166/369 |
| 6,531,694 B2 | 3/2003 | Tubel et al. ........... 250/227.14 |
| 6,561,775 B1 | 5/2003 | Wefers ..................... 417/423.3 |
| 6,571,046 B1 | 5/2003 | Hickey et al. .............. 385/134 |

FOREIGN PATENT DOCUMENTS

| | | | |
|---|---|---|---|
| JP | 59-000582 | * | 1/1984 |
| JP | 09-103049 | * | 4/1997 |
| WO | 00/57540 | * | 9/2000 |

\* cited by examiner

*Primary Examiner*—Karl Tamai
(74) *Attorney, Agent, or Firm*—McAfee & Taft

(57) ABSTRACT

Apparatus, systems and methods are provided for transmission of optical signals through a wellbore whereby optic fibers are protected from exposure to harsh downhole fluids and conditions. The system comprises a power cable assembly running down hole from the surface and comprising both electrical leads and at least one fiber-optic lead, an electric submersible motor apparatus having optic fibers and optic fiber leads as an integral part of the motor and internal to the motor casing, and a connection(s) between the optic fibers internal to the motor casing and downhole sensors and other equipment requiring optical communication.

3 Claims, 9 Drawing Sheets

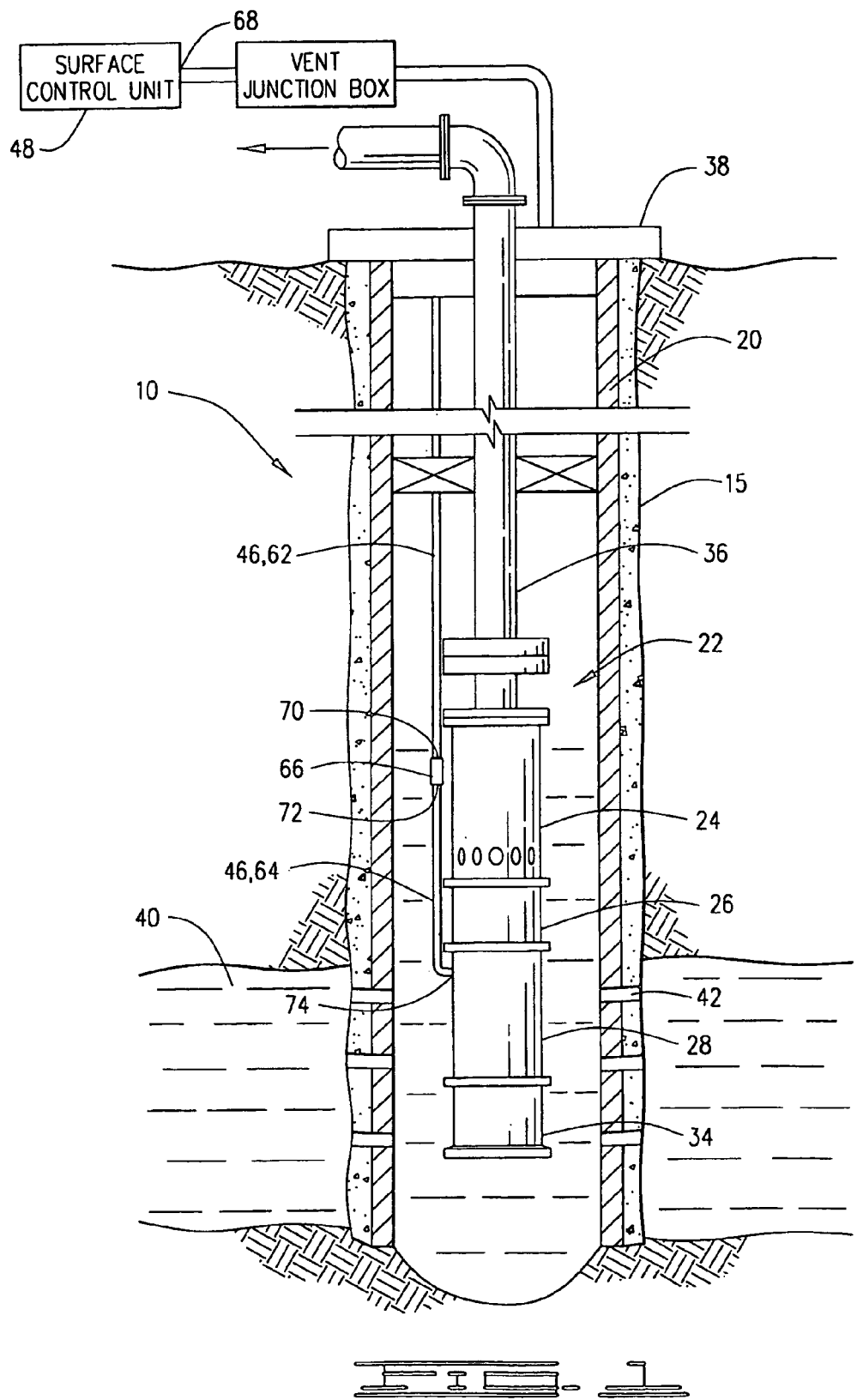

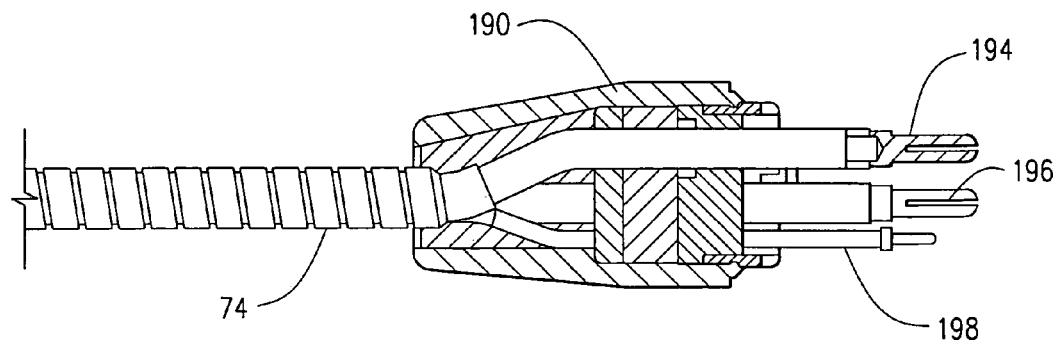
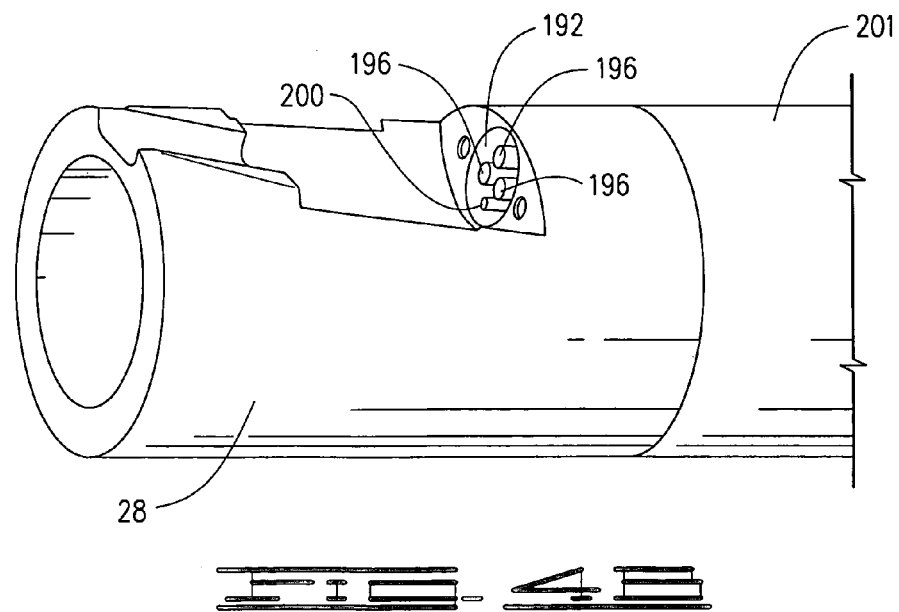

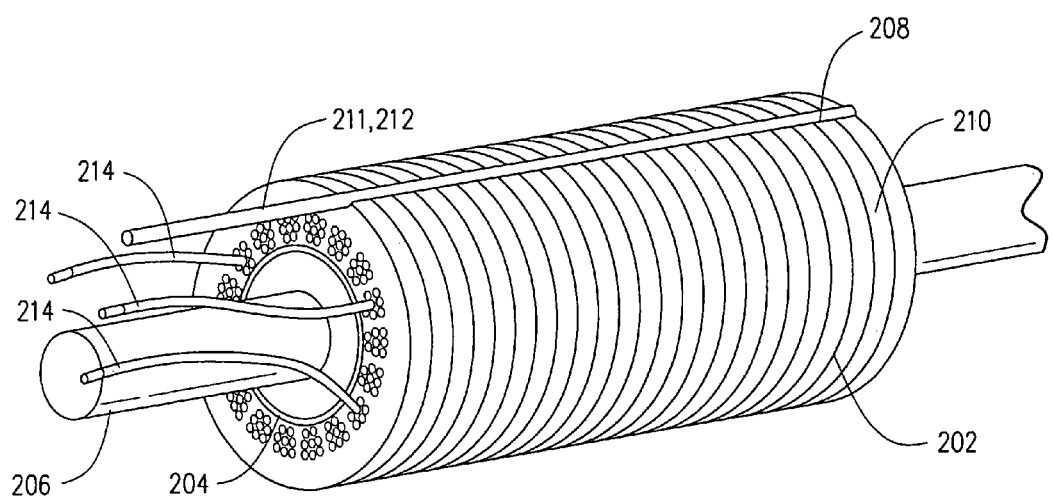
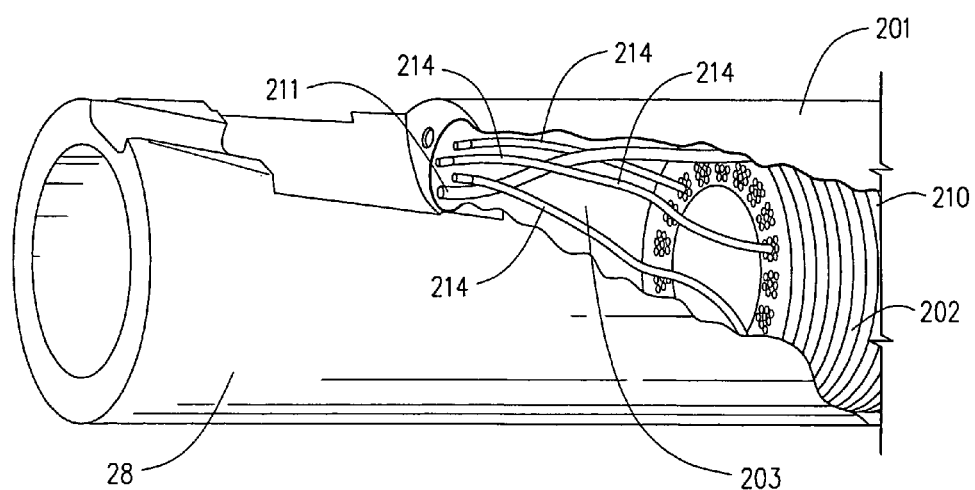

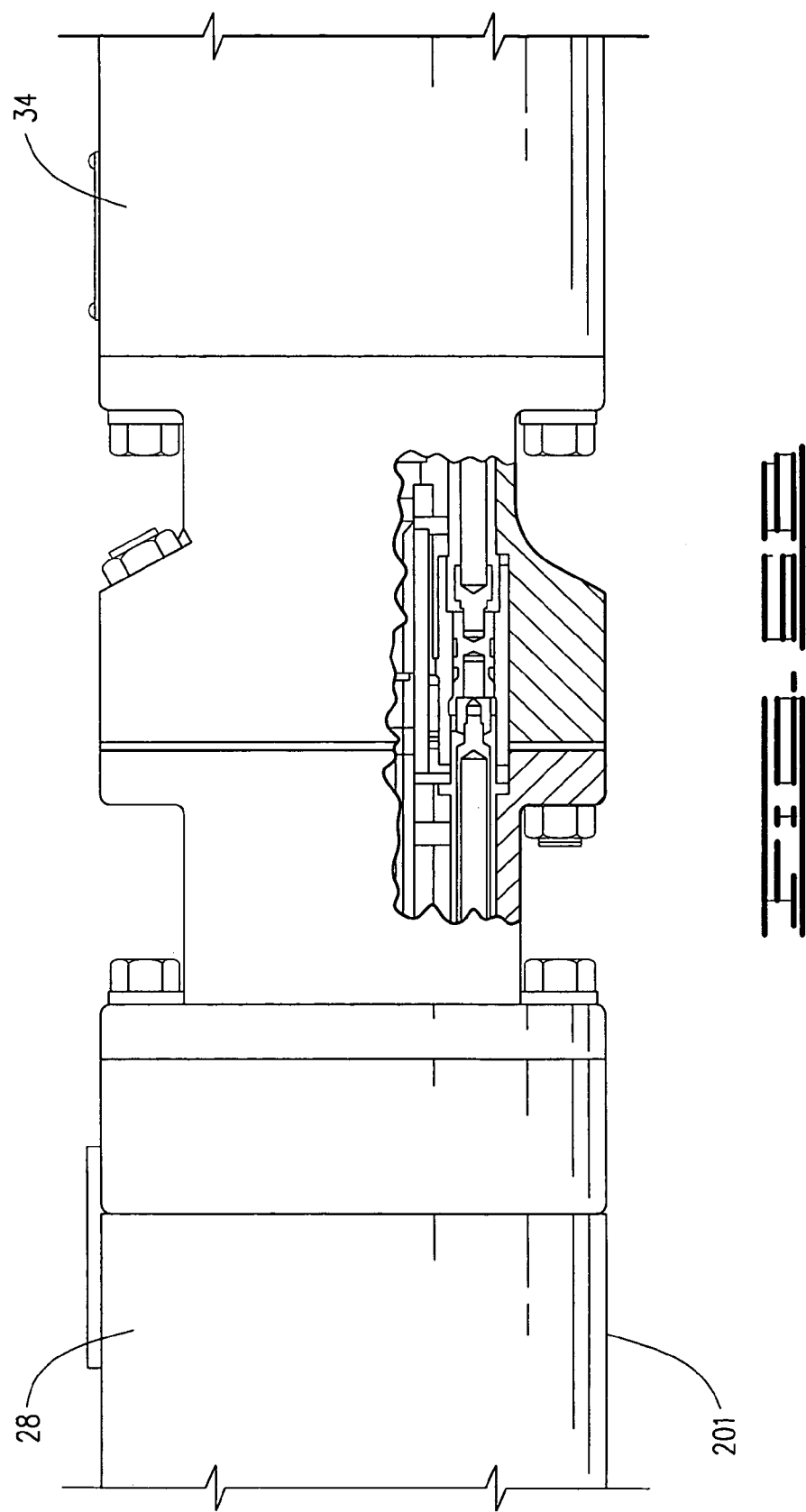

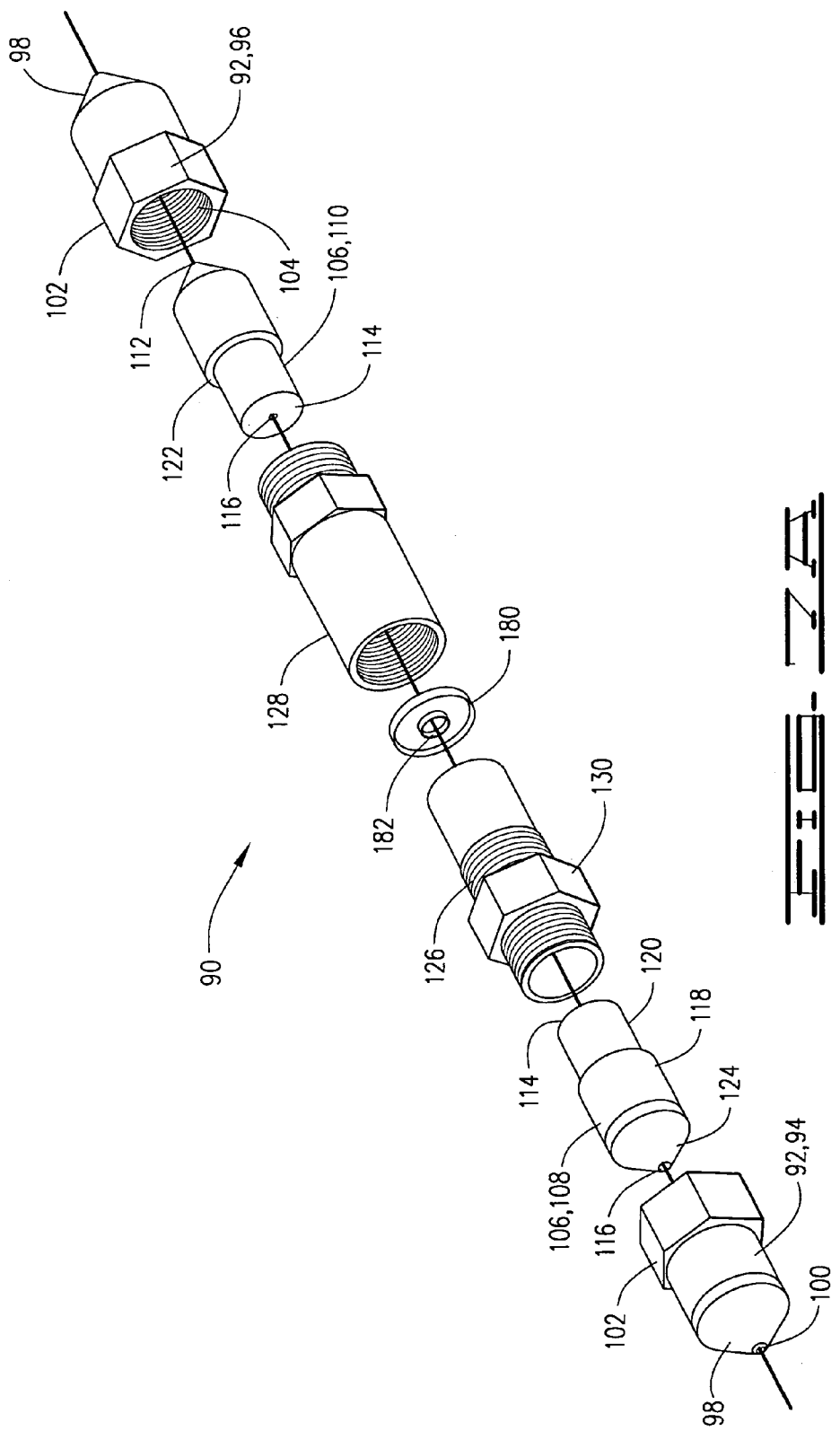

US 7,208,855 B1

FIBER-OPTIC CABLE AS INTEGRAL PART OF A SUBMERSIBLE MOTOR SYSTEM

BACKGROUND OF THE INVENTION

1. Field of the Invention

The present invention relates generally to use of fiber-optic cable for communications with downhole sensors and other equipment, and more specifically to a submersible motor with one or more optic fibers housed therein.

2. Description of the Prior Art

It is often necessary to measure and monitor the conditions in a wellbore that penetrates a subterranean formation. For example, in an oil and gas producing well it may be desirable to measure parameters such as downhole temperature, pressure, presence of water or oil, chemical analysis, flow rate and other conditions in order to adjust operating parameters to optimize production. A variety of methods and devices have been utilized for determining and monitoring downhole conditions in a wellbore. For example, there are a number of electrically operated devices that communicate signals through electrical cables. Fiber-optic sensors are also commonly used to measure downhole parameters and conditions. Temperature-resistant and sealed optic fibers are available, but because of the harsh operating conditions down hole, there is a continuing need for methods and apparatus for protecting optic fibers from the harsh conditions that exist in the wellbore.

SUMMARY OF THE INVENTION

The present invention meets the aforementioned need by providing apparatus, systems and methods for protecting optic fibers from the harsh downhole conditions in a wellbore. An electric submersible motor of the present invention comprises a motor casing or motor housing defining a motor interior. The motor housing has a motor power connector for connecting the submersible motor to a power cable. Power may also be provided by splicing the power cable to conductors internal to the motor. The motor has a stator disposed in the motor housing, a shaft disposed in the stator and a rotor connected to the shaft. The motor interior has one or more optic fibers disposed therein. The one or more optic fibers in the motor interior are connectable to optic fibers in a fiber-optic cable that runs from the surface, and to downhole sensors and other equipment in the well that will receive and/or transmit optical signals.

The system for providing transmission of optical signals through a wellbore whereby optic fibers are protected from exposure to harsh downhole fluids and conditions basically comprises a cable assembly extending from the surface into the wellbore which may comprise electrical conductors and at least one optic fiber. The cable is connectable to electrical leads in the submersible motor and the one or more optic fibers are connectable to the one or more optic fibers in the motor interior. The one or more optic fibers may be connected to sensing devices for sensing parameters in the wellbore, or to sensing devices in the motor to transmit measured parameters in the motor. The one or more optic fibers may be positioned in a groove, or channel defined on the exterior of the stator.

The objects, features and advantages of the present invention will be readily apparent to those skilled in the art upon a reading of the description of preferred embodiments which follows.

DESCRIPTION OF THE DRAWINGS

To better understand the present invention, reference should be made to the following drawings. Elements have been given numerals and are referred to in the Detailed Description of the Invention.

FIG. 1 is a schematic illustration of a wellbore showing general placement of a cable assembly with electrical conductors and optic fibers, a submersible motor and optical sensors.

FIGS. 4A–4B illustrate the connection between the motor lead cable and the motor.

FIGS. 5A–5B diagram portions of the submersible motor and general placement of electrical conductors and optic fibers.

FIGS. 6A–6B provide a general scheme for termination or connection of electrical conductors and optic fibers at the bottom end of a submersible motor.

FIG. 7A is an exploded view of a fiber-optic splice.

DESCRIPTION OF THE PREFERRED EMBODIMENTS

Figure 2A:
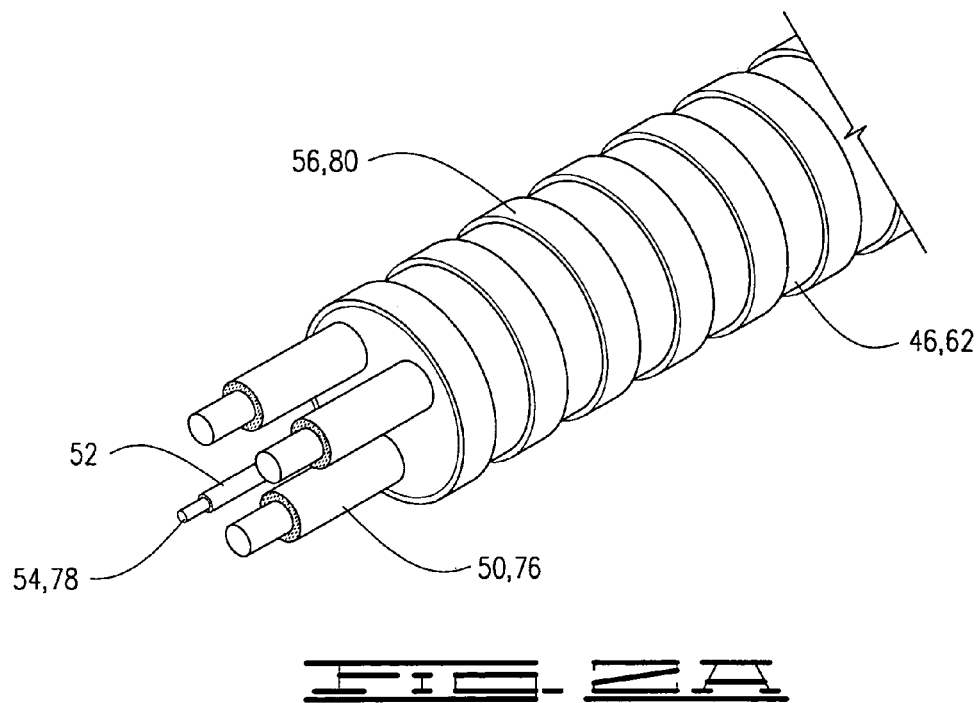
FIGS. 2A–2B show embodiments of a surface cable assembly.

The present invention provides apparatus, systems and methods for downhole fiber-optic communication whereby optic fibers are protected from the harsh conditions existing in a wellbore. The invention embodies the use of a fiber-optic cable for providing communication to, from, and between components of a downhole string that may include pumps, motors, gas separators, well test equipment and other components. A fiber-optic cable, or fiber-optic assembly is run into the wellbore along with a power cable. The fiber-optic assembly may be strapped to the power cable, which includes electrical conductors that can be connected to an electric submersible motor, or can be contained in the same outer covering, or armor, as the electrical conductors. Reference herein to a "cable assembly" includes the fiber-optic cable and the power cable, whether strapped together, made as one cable, or run separately. The cable assembly is connected to an electric submersible motor having optic fibers disposed in a motor interior thereof. The optic fibers in the motor interior are connectable to downhole sensors and other equipment requiring optical communication.

FIG. 1 shows a well 10 comprising a wellbore 15 having casing 20 cemented therein. A tool string 22 is shown lowered into well 10. Tool string 22 comprises a submersible pump 24, a seal section 26 connected to the submersible pump 24, and an electric submersible motor 28 connected to seal section 26. In the representation in FIG. 1, only one submersible motor 28 is shown, but it is understood that more than one motor may be utilized. Sensors 34, which may be and preferably are fiber-optic sensors, may be installed in the well, and as shown in FIG. 1 may be positioned below electric submersible motor 28. Tool string 22 may be lowered into the well by any means known in the art, such as for example, with a tubing 36 that may comprise jointed or coiled tubing. Tool string 22 is lowered through a wellhead 38. The well 10 intersects a subterranean hydrocarbon-producing formation 40. Casing 20 has openings therethrough, such as perforations 42 to communicate fluids from formation 40 into well 10. Motor 28 will drive pump 24 to urge fluid in well 10 upwardly to the surface.

Figure 2B:
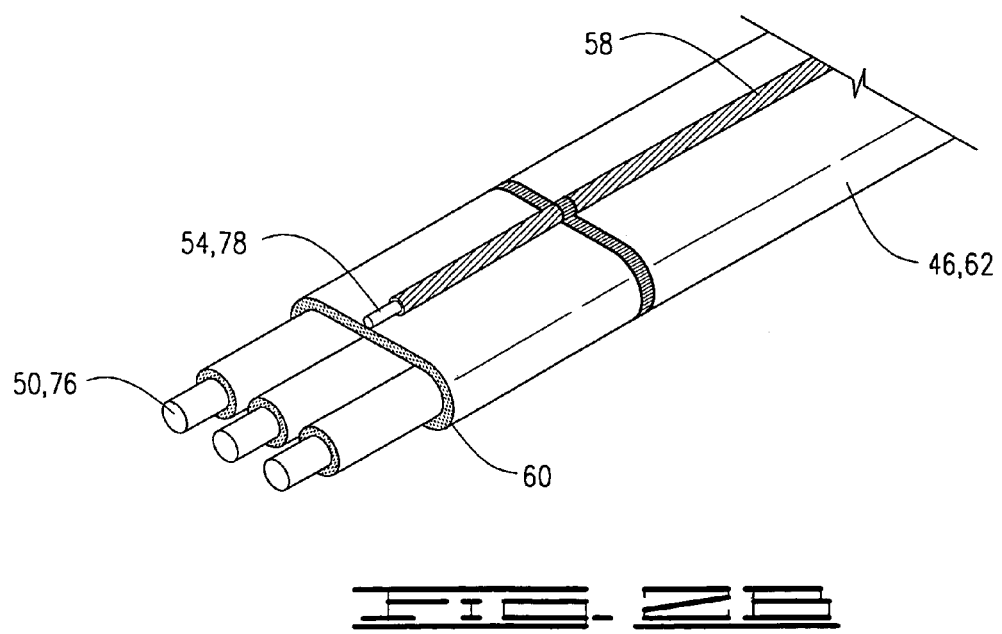
Figure 3A:
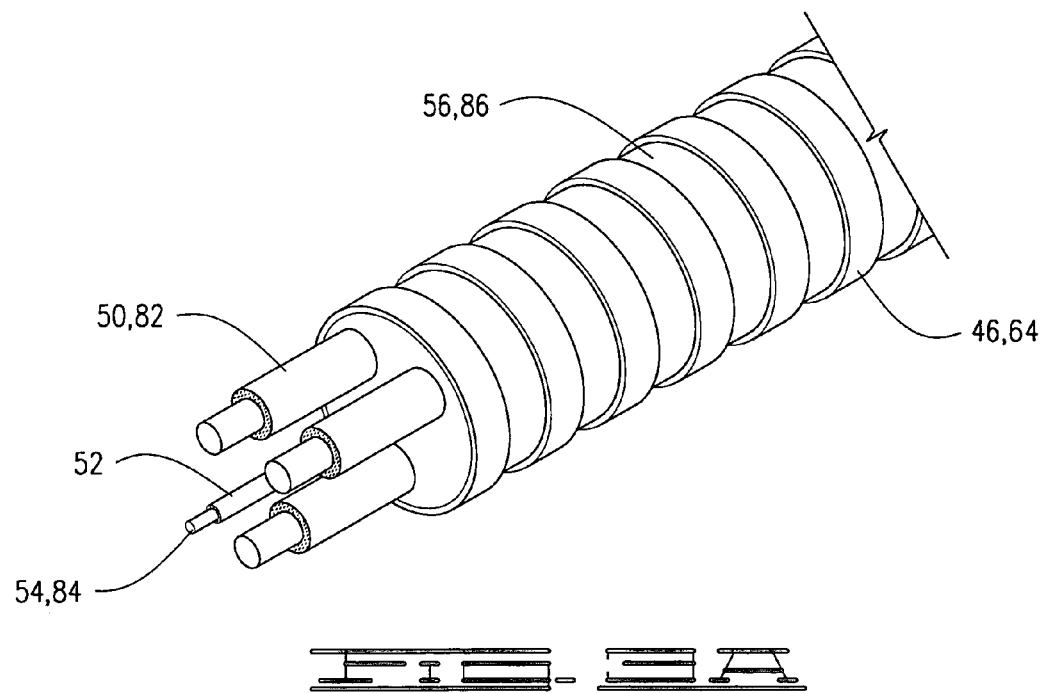
FIGS. 3A–3B show embodiments of a motor lead cable assembly.
Figure 3B:
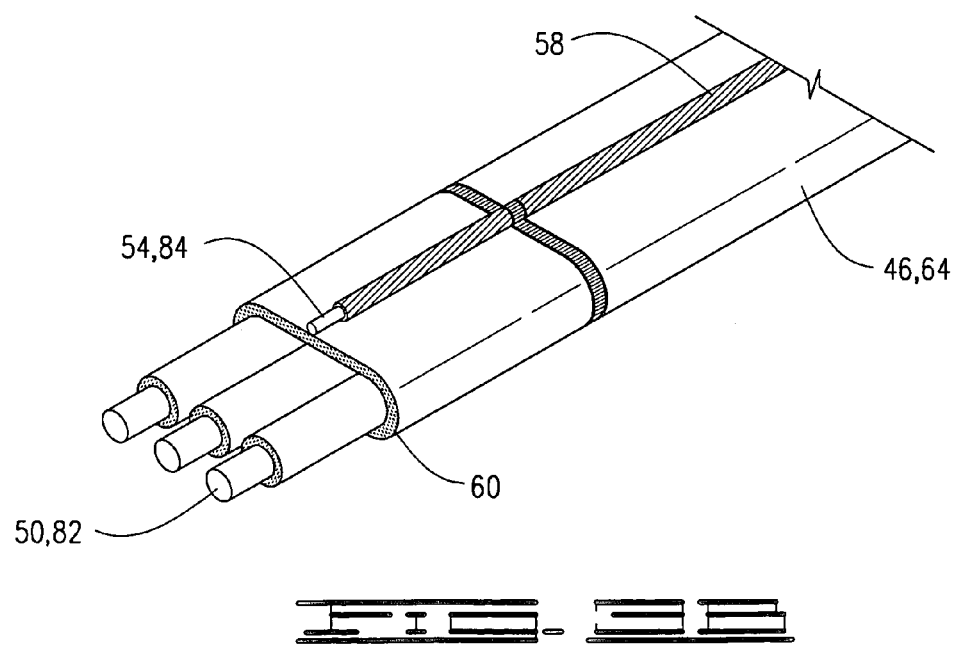

Fiber-optic sensors 34 may be installed in the well 10 for continuously or periodically providing measurement of downhole parameters and conditions, such as, but not limited to, temperature, pressure and fluid flow rate. A cable assembly 46 extends from a surface control unit 48 into the well 10 to provide power to motor 28. As shown in FIGS. 2A–2B, the cable assembly 46 includes a plurality of power conductors, and preferably three power conductors 50, and a fiber-optic assembly 52 that includes at least one, and may include a plurality of optic fibers 54. Conductors 50 and optic fibers 54 may be disposed in and protected by a single outer armor 56, or, if desired, fiber-optic assembly 52 may have an outer armor 58, strapped or otherwise attached to an outer armor 60 in which power conductors 50 are contained. The fiber-optic assembly may include a single or multiple optic fibers, and may comprise bundles of optic fibers wherein the optic fibers are bundled in groups of 1–8. It is understood that the material for the outer armor is designed to withstand harsh downhole environments, and thus to withstand extreme temperatures, pressures and chemical conditions.

Cable assembly 46 may be comprised of upper, or surface cable 62 which is connected to motor lead cable 64 by a splice, or connector 66. Surface cable 62 has first, or upper end 68 connected to control unit 48 which will supply power, and which may transmit, receive, translate and/or convert optic signals, or perform any other operation with respect thereto. Lower, or second end 70 of surface cable 62 is connected to splice 66.

Motor lead cable 64 has first or upper end 72 connected to splice 66, and second or lower end 74 connected to motor 28, which may be, for example, a three-phase electric motor.

In the embodiment shown in FIG. 1 and FIG. 2A, power conductors 50 and optic fibers 54 are housed in single outer armor 56. Surface cable 62 thus has electrical conductors 76 and one or more optic fibers 78 housed in outer armor 80, and motor lead cable 64 has electrical, or power conductors 82 and one or more optic fibers 84 housed in outer armor 86. Power conductors 76 are connected to power conductors 82 with splice 66 by any manner known in the art, as are one or more optic fibers 78 to one or more optic fibers 84. One manner of connecting optic fibers is shown in FIGS. 6A and 6B which shows a splice unit 90 for splicing a single optic fiber.

Splice unit 90, which may comprise a part of splice 66, has compression barrels 92, which will be referred to as first and second compression barrels 94 and 96 for ease of reference. First and second compression barrels 94 and 96 are identical. Compression barrels 92 have a first, or tapered end 98 with an opening 100 therethrough for closely receiving an optic fiber 54. Compression barrels 92 further comprise a second end 102 defining internal thread 104. Splice unit 90 further comprises a pair of identical compression seals 106, which may be referred to as first and second compression seals 108 and 110. Compression seals 106 have first and second ends 112 and 114, respectively, and have an opening 116 extending therethrough. Compression seals 106 have a first generally cylindrical portion 118 and a second generally cylindrical portion 120 extending from first generally cylindrical portion 118. A shoulder 122 is defined by and extends between first and second generally cylindrical portions 118 and 120. A tapered portion 124 extends from first cylindrical portion 118 to end 112. Tapered portion 124 is shaped to match the shape, or contour of tapered end 98 on compression barrels 92.

Figure 7B:
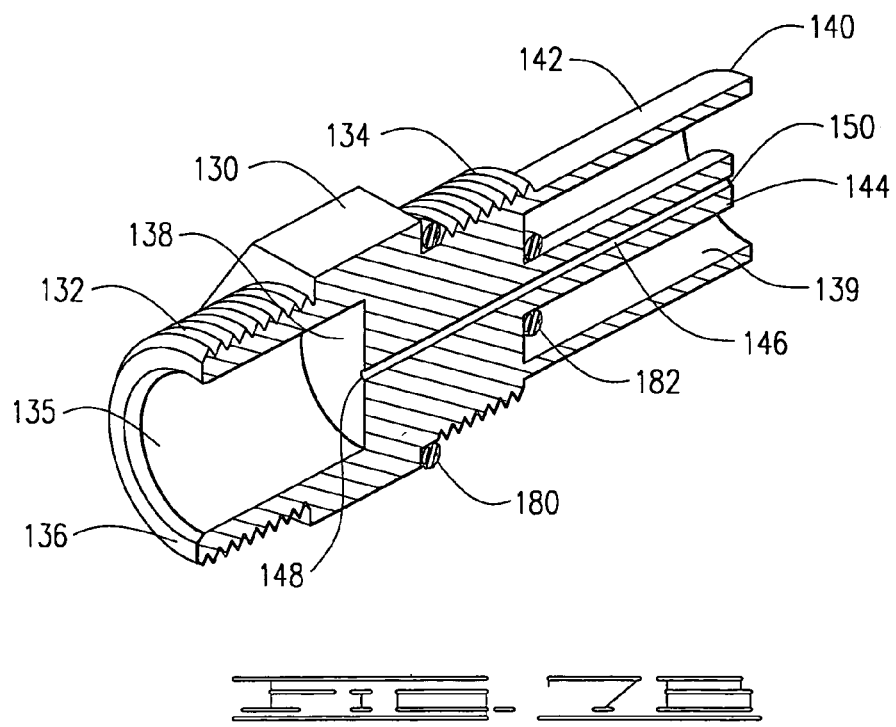
FIGS. 7B and 7C are section views of specific components of the splice of FIG. 7A.
Figure 7C:
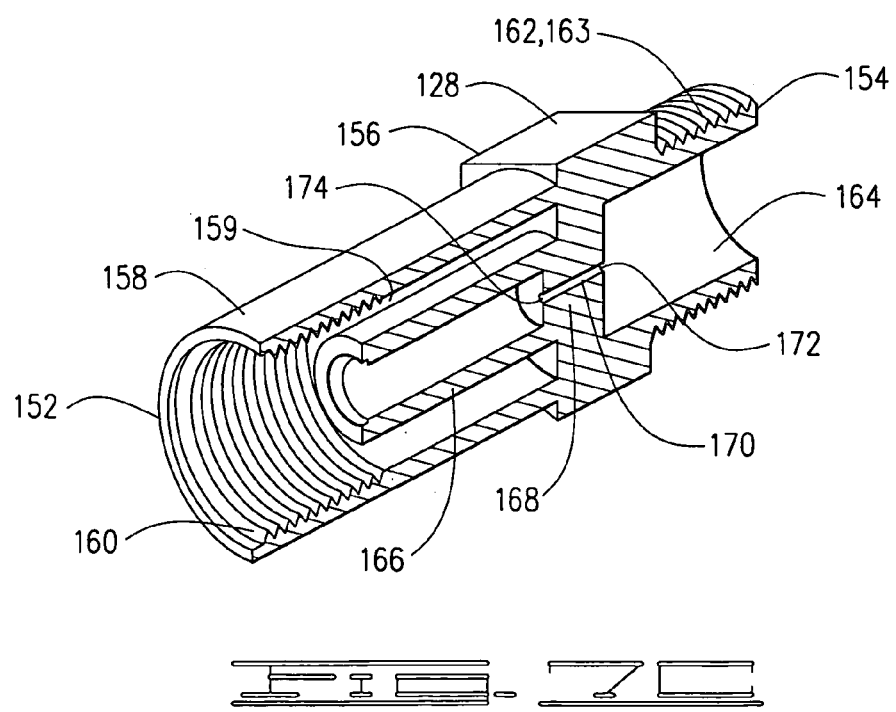

Splice unit 90 also includes first, or insertion connector body 126 and a second, or receiving connector body 128, which may be referred to as a receptacle 128. The details of first and second connector bodies 126 and 128 are shown in FIGS. 7B and 7C, respectively. First connector body 126 has a body portion 130, which may be a hex-shaped body portion. First and second threaded portions 132 and 134 extend from body portion 130 in opposite first and second directions, the first direction being toward first compression seal 108. A first central opening 135 extends from first end 136 of connector body 126 and terminates at a core 138. A second central opening 139 extends from a second end 140 of connector body 126 and terminates at core 138. Second central opening 139 is defined by sleeve, or sleeve portion 142 that extends in the second direction from second threaded portion 134. An extension 144 is connected to core 138, and is disposed in sleeve portion 142. A generally cylindrically shaped passage 146 having first end 148 and second, or terminating end 150 is defined through core 138 and extension 144.

Second, or receiving connector body 128 has first end 152 and second end 154. Second connector body 128 further comprises a body portion 156 which may be a hex-shaped body portion. A first end portion 158 which may be referred to as receptacle portion 158 defines first central opening 159. First end portion 158 has an internal thread 160. A second end portion 162 defines second central opening 164, and has an outer or external thread 163 thereon.

A generally cylindrically shaped receiving sleeve 166 extends in a first direction toward first end 152 from a central core 168 of second connector body 128. Central opening 159 extends from core 168 to first end 152. Central core 168 has a passage 170 with a first end 172 and a second or terminating end 174. To splice an optic fiber such as for example to splice an optic fiber 78 to an optic fiber 84, an optic fiber 78 in surface cable 62 is inserted through first compression barrel 94, first compression seal 106 and first connector body 126. Optic fiber 78 is positioned so that an end thereof is at terminating end 150 of passage 146. An optic fiber 84 may be inserted through second compression barrel 96, second compression seal 110 and second connector body 128 so that an end thereof is at terminating end 174 of passage 170. A first O-ring 180 is sealingly disposed about sleeve portion 142 of first connector body 126 and a second O-ring 182 is sealingly disposed about extension 144. When the ends of optic fibers 78 and 84 are positioned at terminating ends 150 and 174, the assembly is threaded together so that first connector body 126 is threaded to first compression barrel 94 and urges first compression seal 108 into engagement with tapered end 98 of first compression barrel 94. Likewise, second connector body 128 is threaded into second compression barrel 96 so that tapered portion 124 of second compression seal 110 engages tapered end 98 of second compression barrel 96. First and second connector bodies 126 and 128 are threaded together tightly so that a butt splice or butt junction is formed between the optic fibers positioned in first passageway 146 and passage 170. The splice will supply a butt splice or butt junction with very little decibel loss and preferably no more than 0.5 db loss. Compression seals 106 are preferably made of a material such as aflas, viton or similar material designed to withstand harsh downhole conditions. Likewise, the bodies of the barrels and connector bodies are preferably made from stainless steel, monel, nitronic 50 or other material which will withstand wellbore conditions. Splice units 90 can be used for splicing optic fibers in surface cable 62 to optic fibers in motor lead cable 64 and may be used in any situation where a splice is necessary.

Second end 74 of motor lead cable 64, which comprises the lower end of cable assembly 46, has a plug 190. Plug 190 is adapted to be received and connected to a receptacle 192 in motor 28. Plug 190 will have a plurality of prongs and preferably three prongs 194 to connect a plurality and in the embodiment shown the three electrical conductors 50 to receptacle 192 which will have mating receivers 196. Such an arrangement is known in the art. Plug 190, however, will likewise have an end connector, or prong 198 adapted to be received in a receiver 200 to provide a continuous optic fiber assembly. The motor lead cable 64 is preferably connected to motor 28 remotely as is known in the art and thus surface cable 62 may be spliced to motor lead cable 64 with splice 66 after motor lead cable 64 is connected to motor 28.

Figure 5A:
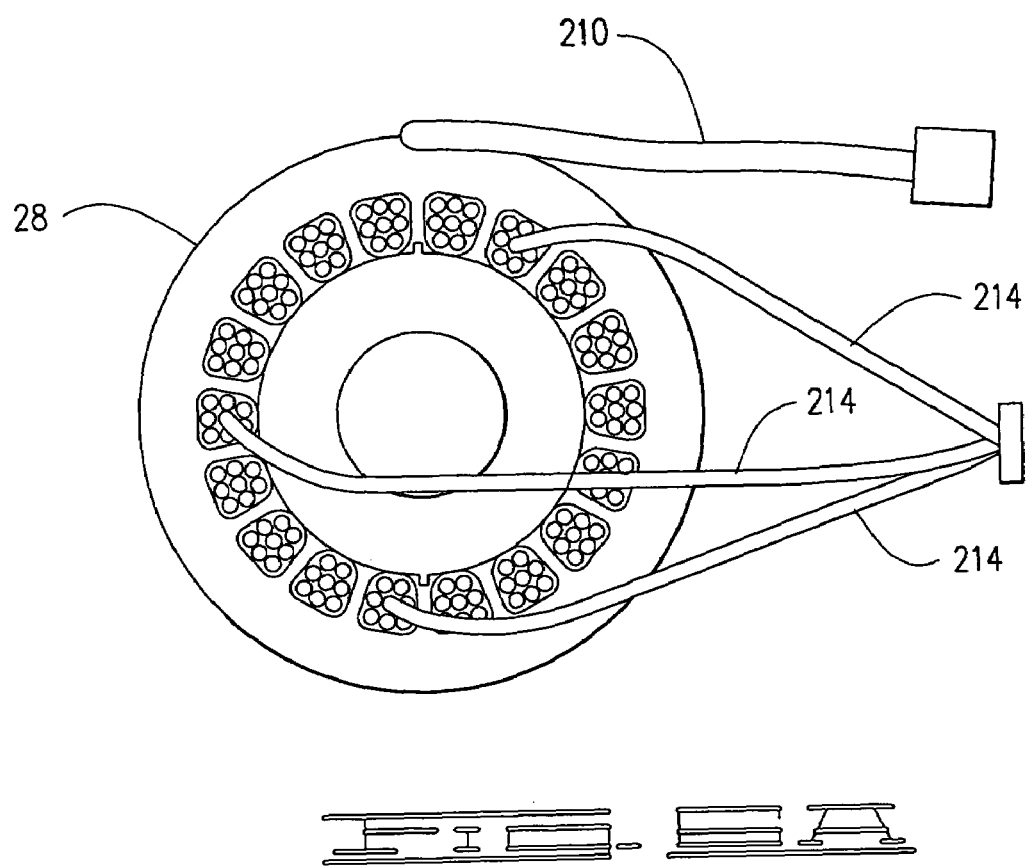

Motor 28 which in the embodiment shown in FIG. 1 includes one motor 28 but may include a plurality of motors above sensor 34, has a motor housing or motor casing 201 in which receptacle 192 is defined. As shown in FIGS. 5A and 5B, motor 28 is of a type known in the art having a stator 202 disposed in motor housing 201, and more specifically disposed in a motor interior 203 defined by motor housing 201. A rotor 204 is positioned in stator 202 and a shaft 206 is disposed in rotor 204. Such motors are known in the art and, as is understood, shaft 206 will rotate and will drive an electric submersible pump such as submersible pump 24 when power is supplied to motor 28.

Stator 202 has a groove or notch 208 in the outer surface 210 thereof for receiving a fiber-optic assembly 211 that may include one or more optic fibers 212. Thus, optic fibers 212 are disposed in motor housing 201 and may be connected to sensor 34 in any manner known in the art. One example of sensors used down hole is shown in U.S. Pat. No. 5,892,860 to Maron et al., the details of which are incorporated herein by reference. One or more optic fibers is thus provided to extend from surface control unit 48 to a sensor, or sensors 34 wherein the optic fibers are disposed within motor casing 201 and thus are protected from harsh downhole environments.

Motor 28 will also have power conductors 214 as is known in the art, connected as described herein and as is known to power conductors 50. If more than one motor is utilized, motors are connected by any manner known in the art, and power is supplied by any manner known in the art. When a sensor is utilized, it may be for example as shown in the Maron, et al. patent. Alternatively, sensor 34 may be a sensor that has an interface connector modified to match an interface connector on a motor 28 such that the optic fiber extending from motor casing 201 is connected to a sensor 34 as shown schematically in FIG. 6B. The sensor, such as sensor 34 is thus operatively associated with the optic fiber(s) such that it is adapted to receive and/or transmit signals from the optic fiber(s) and thus to communicate with surface control unit 48 to supply signals representative of any desired parameter such as pressure, temperature, flow rate or other downhole condition. If desired, an optic fiber may terminate in the motor and may be connected to a sensor therein so that a signal representative of a condition in the motor, such as temperature, may be transmitted. If more than one motor is utilized, the power conductors will, as known in the art, be connected to the next motor in sequence, and the optic fibers can be connected thereto through the interface connector as shown in FIG. 5B, and the sensor can be connected to the lowermost motor. If a downhole sensor is not included in the string, the power conductors are terminated in the motor by any means known in the art, and the one or more optic fibers 212 in the motor 28 should have a cover to protect the ends thereof. Rather than connecting to motor lead cable 64, surface cable 62, and more specifically power conductors 76 and one or more optic fibers 78, may be directly spliced to power conductors 214 and one or more optic fibers 212 in the motor interior 203. Power conductors may be connected in any manner known in the art, and optic fibers may be spliced as described herein.

Although in the embodiment shown herein, the motor lead cable utilizes a plug, the fiber-optic assembly may, if desired, be simply routed into the motor and out of the motor to the sensor and sealed such that oil within the motor cannot escape.

While the above disclosure is directed to the preferred embodiments of the invention, numerous modifications can be made by those skilled in the art. Such modifications are encompassed within the spirit of this invention as defined by the appended claims.

What is claimed is:

1. A system for providing transmission of optical signals through a wellbore, the system comprising:
   a surface cable assembly comprising electrical conductors and at least one optic fiber running into the wellbore from the surface;
   an electric submersible motor having a motor casing, and having one or more optic fibers disposed therein;
   a motor lead cable assembly comprising electrical conductors and at least one optic fiber, the electrical conductors and the at least one optic fiber terminating in a plug at an end of the motor lead cable assembly, the motor lead cable being connectable to the electric submersible motor by inserting the plug in a receptacle defined in the motor casing, thereby connecting the at least one optic fiber in the motor lead cable to the one or more optic fibers in the electrical submersible motor, wherein the electrical conductors in the power cable are connected to the electrical conductors in the motor lead cable; and
   a splice for connecting the at least one optic fiber in the surface cable assembly to the at least one optic fiber in the motor lead cable assembly, wherein the at least one optic fiber in the motor casing is adapted to be connected to the at least one optic fiber in the motor lead cable assembly to transmit a signal representative of a sensed parameter, the splice for connecting the end of the surface cable assembly to the end of the motor lead cable assembly comprising:
      first and second compression barrels, each having first and second ends, the first end having an opening for receiving an optic fiber;
      first and second connector bodies threadedly connected to the first and second compression barrels, respectively; and
      a first compression seal positioned between the first compression barrel and the first connector body, and a second compression seal positioned between the second compression barrel and the second connector body, wherein the at least one optic fiber from the surface cable assembly is inserted into the first compression barrel and the at least one optic fiber from the motor lead cable is inserted into the second compression barrel to form a butt splice when the first and second connector bodies are connected to each other and to the first and second compression barrels, respectively.

2. The system of claim 1, the first and second compression barrels each having a taper at the first end thereof, wherein the first and second compression seals each have a tapered end to mate with the taper at the first ends of the first and second compression barrels.

3. The system of claim 2, wherein the first and second connector bodies each have a passage defined therein, the passage in the first connector body being adapted to receive the at least one optic fiber from the surface cable assembly, and the groove in the second connector body being adapted to receive the at least one optic fiber from the motor lead cable, wherein ends of the at least one optic fiber from the surface cable assembly and from the motor lead cable assembly form a butt junction.

* * * * *